United States Patent [19]

Slusher

[11] 3,727,746
[45] Apr. 17, 1973

[54] FLEXIBLE AUGER

[75] Inventor: Emmet Garr Slusher, Lexington, Mo.

[73] Assignee: Bank of Higginsville, Higginsville, Mo.

[22] Filed: Oct. 22, 1970

[21] Appl. No.: 82,895

[52] U.S. Cl. ................................................198/213
[51] Int. Cl. .................................................B65g 33/00
[58] Field of Search ..............................198/213, 64; 222/412, 413; 302/50

[56] References Cited

UNITED STATES PATENTS

| | | | |
|---|---|---|---|
| 3,381,801 | 5/1968 | Rastoin | 198/64 X |
| 2,888,128 | 5/1959 | Allen | 198/213 X |
| 2,626,422 | 1/1953 | Lammertse | 198/127 R X |

Primary Examiner—Evon C. Blunk
Assistant Examiner—Douglas D. Watts
Attorney—J. David Wharton

[57] ABSTRACT

An auger for a conveyor comprising an elongated shaft capable of extending along a curvilinear axis, a flexible, rotatable tube telescoped over the shaft and an elongated helical vane of flexible material extending outwardly from the tube. In a typical embodiment, the auger is used with a housing closed along one side with an upright wall and a wall extending downwardly at an angle into relatively close proximity to the auger. The bottom and the other side of the housing comprise spaced apart, elongated rods which support the assembly and permit gravitation of trash from the conveyor. An elongated, rotatable hose above the auger serves to deflect conveyed items toward the closed side of the conveyor for proper transfer by the auger and a shield maintains the conveyed items in proper location with respect to the auger.

8 Claims, 11 Drawing Figures

INVENTOR.
Emmet Garr Slusher
BY Don M. Bradley
Attorney

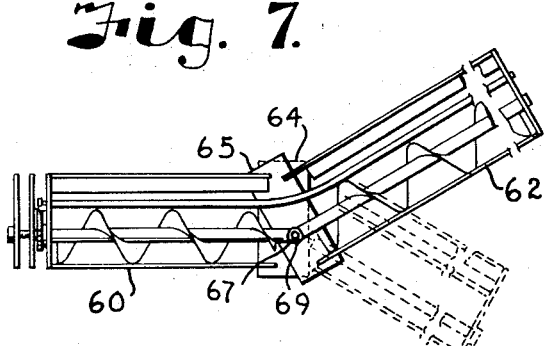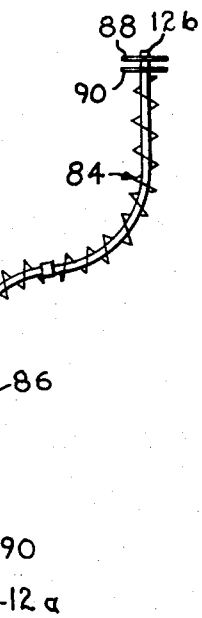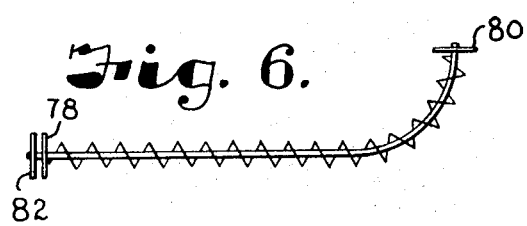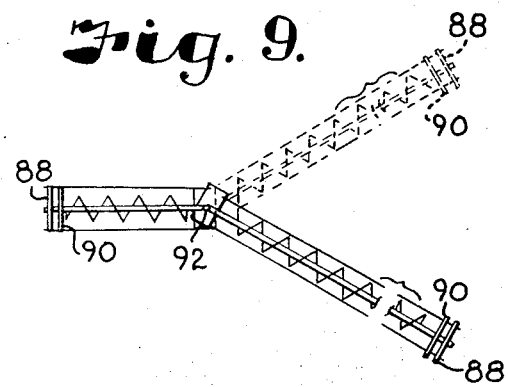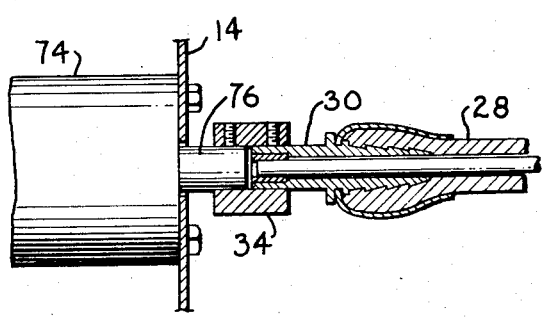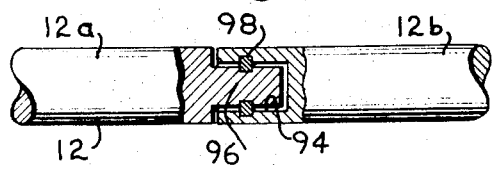

FLEXIBLE AUGER

This invention relates to conveyors, and more particularly to an auger capable of flexing to provide a conveyor for transporting articles along curvilinear paths of travel.

Conventional augers are constructed of rigid materials and rotate on straight line axes. Conveyors of this type are entirely adequate for many applications where it is permissible and even often desirable for the conveyed material to traverse a straight line path. It is sometimes possible to provide a generally curved or irregular path by use of a series of straight conveyors extending along segments defining the path.

Some installations, however, are not well suited to the use of a series of straight conveyors. For example, the transfer of delicate items such as harvested fruit or the like from substantial heights to receptacles at lower elevations often requires that the items be moved on a generally curvilinear path of travel. Attempts have been made to use a series of straight conveyors for this purpose in an arrangement whereby one conveyor discharges onto the outlet end of a succeeding conveyor in the series. The vertical transfer distance for the items at the junction between the ends of the succeeding conveyors often bruises or otherwise damages the items.

Further, a plurality of separate power sources or at least relatively complex power transmission means must be employed for operating each conveyor of a series thereof. This increases the cost of construction and operating the conveying equipment. The space required for such installations is also usually greater than that needed in a single conveyor installation.

Accordingly, it is a primary object of the present invention to provide a conveyor having flexible components to permit operation of the conveyor over a curvilinear path of travel.

It is another object of the invention to provide an auger rotatable on a non-straight line axis.

Still a further object of this invention is to provide a flexible auger which is highly versatile and capable of successful operation along any of a wide variety of possible axes of rotation.

Another important object of the present invention is to provide an auger type conveyor which may operate on a curvilinear path of travel, yet which may be powered at one end of the auger with the motivating power being transferred longitudinally through the auger without requiring auxiliary motivating means.

Still another object of the invention is to provide a conveyor of this type having a novel housing for gently transferring delicate fruit or other items while permitting egress of trash or foreign material from the conveyor.

A yet further object of this invention is to provide a conveyor equipped with a novel rotatable, flexible deflector for confining the items to that portion of the conveyor constructed for gentle movement of the items and to avoid spillage of the items from the conveyor.

These and other important object of this invention will be further explained or will become apparent from the description, claims and drawings.

In the drawings:

FIG. 5 is a diagrammatic top plan illustration of an installation having an auger disposed on a laterally extending curvilinear axis;

FIG. 6 is a view similar to FIG. 5 but showing the shaft support at the opposite end of the shaft from that of FIG. 5;

FIG. 7 is a fragmentary, side elevational view on a reduced scale illustrating a form of hinged trough construction which may be used in conveyors of this invention;

FIG. 8 is a view similar to FIGS. 5 and 6 but showing the top view of a two section conveyor embodying the principles of this invention, the conveyor troughs and joint being ommitted for simplicity;

FIG. 9 is a view similar to FIG. 8 but showing the side view of the conveyor and conveyor troughs;

FIG. 10 is a fragmentary, enlarged side elevational view of the joint between two shaft sections for the conveyor of FIGS. 8 and 9; and FIG. 11 is a view similar to FIG. 3 but illustrating an alternate drive arrangement.

Figure 1:
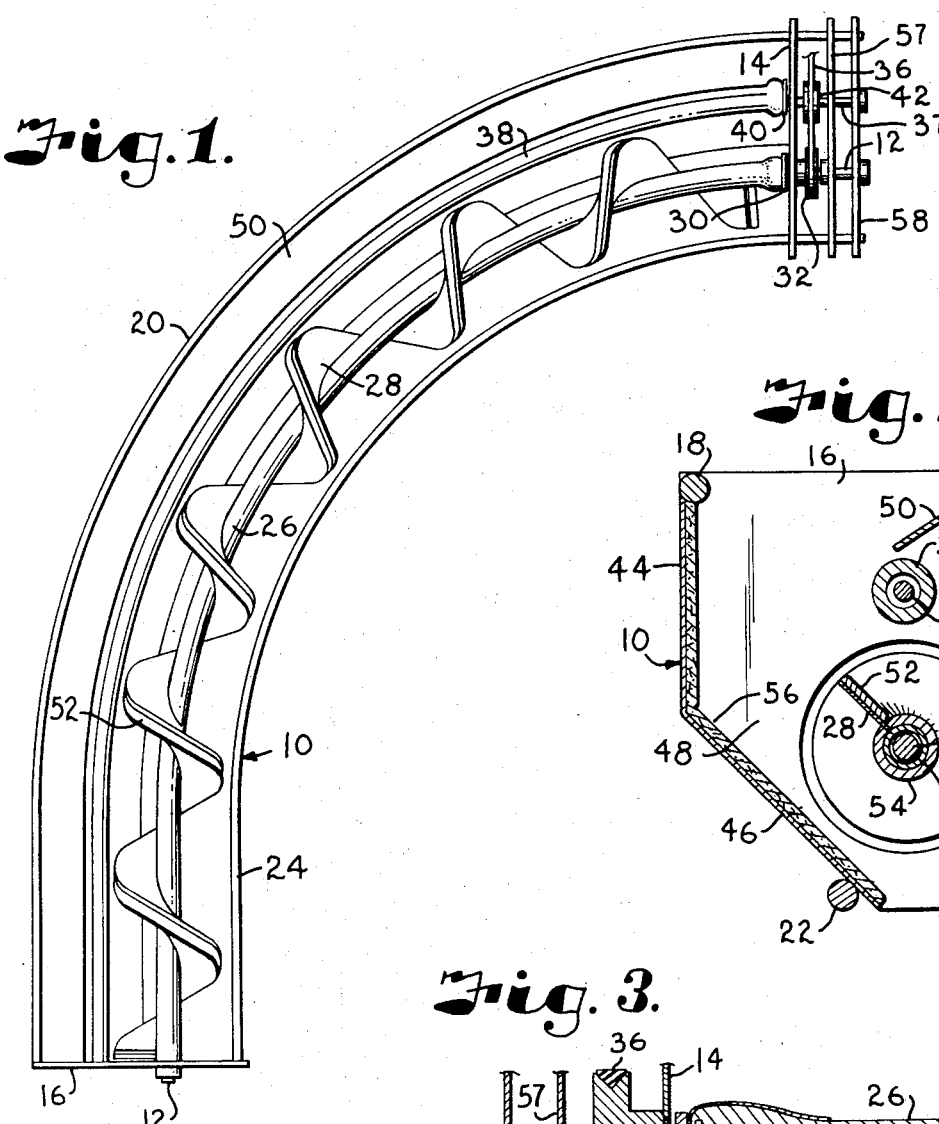
FIG. 1 is a top plan view of a conveyor embodying the principles of this invention.
Figure 2:
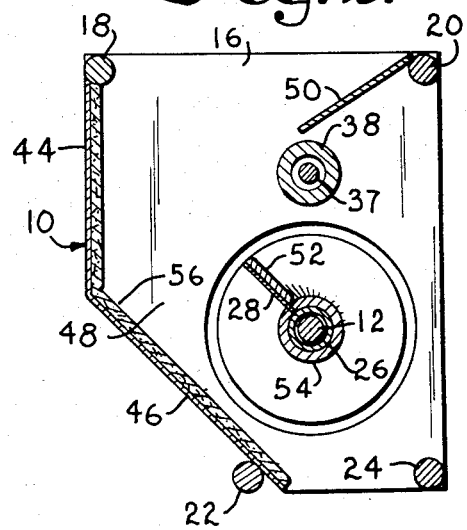
FIG. 2 is an enlarged, transverse, cross-sectional view through the conveyor of FIG. 1.
Figure 3:
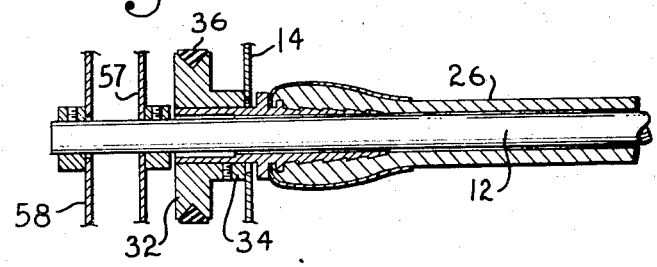
FIG. 3 is a fragmentary, detailed cross-sectional view illustrating the drive arrangement for the conveyor of FIG. 1.

Referring initially to FIGS. 1 and 2, a conveyor embodying the principles of this invention is broadly designated by the reference numeral 10 and comprises an elongated, stationary, relatively rigid shaft 12 having opposite ends extending through end plates 14 and 16 comprising parts of the conveyor trough. The plates 14 and 16 are interconnected by spaced apart, elongated, rigid rods 18, 20, 22 and 24 as shown best in FIG. 2.

It will be noted that the rods 18 and 20 are spaced further apart than are rods 22 and 24 for a purpose to be described hereinafter.

An elongated, flexible tube 26 is telescoped over shaft 12 and is rotatable thereon. Shaft 12 may follow any desired axis and in the embodiment illustrated in FIG. 1, the shaft is curvilinear. Tube 26 may be of any suitable, flexible material such as rubber, neoprene, flexible plastic or the like so that the tube will readily follow the curvilinear longitudinal contour of the transversely round shaft 12.

A helical vane 28 also of flexible material is integral with or secured to the outer surface of tube 26 and project generally radially therefrom. The convolutions of vane 28 extend longitudinally of tube 26 throughout any desired length for the auger of conveyor 10. The material for the vane and tube may be relatively soft rubber, plastic or other synthetic material. The vane can be adhesively secured to the outer surface of the tube.

The end of tube 26 proximal plate 14 is rigidly secured to a tubular member 30 extending through plate 14. Member 30 may be in the nature of a hose coupling adapted to be securely fastened to the proximal end of tube 26.

A pulley 32 telescoped over shaft 12 outboard of plate 14 is rigidly secured to member 30 by means of a fastener 34 so that rotation of pulley 32 imparts a corresponding rotation of tube 26 on shaft 12. Pulley 32 is coupled through a belt or other suitable drive 36 with a prime mover in the nature of an electric motor or hydraulic motor or the like (not shown). A second shaft 37 which may be similar to shaft 12 is mounted in plates 14 and 16 and extends in spaced parallelism from shaft 12 as illustrated best in FIG. 2. A flexible tube 38 which may be of material similar to that of tube 26 is telescoped over shaft 36 for rotation thereon. The end of tube 38 proximal plate 14 is secured to a coupling 40 extending through the plate. A pulley 42 secured to coupling 40 is engageable with belt 36 for rotating tube 38 on its shaft and in the same direction as tube 26 rotates on shaft 12 as indicated by the arrows in FIG. 2.

The side of the conveyor trough defined by spaced rods 18 and 22 is closed by a generally vertically extending wall portion 44 depending from rod 18 and an angled wall portion 46 extending between the end of portion 44 and rod 22. The space 48 extending longitudinally of the auger is bounded by portions 44 and 46, the auger and the rotatable tube 38. Items deposited in space 48 are moved longitudinally of the trough by the vane 28. The rotating tube 38 serves as a deflector for preventing the items from rolling over the auger and out the open side of the trough. Manifestly, the spacing between tube 26 and wall portion 46 is sufficiently small that it prevents gravitation of the items between the auger and the angled wall portion.

An additional deflector or shield 50 extends downwardly and inwardly from rod 20 in position to catch any items which might tend to roll over tube 38. The spacing between deflector 50 and tube 38 is such that the items have a tendency to roll upon the deflector and return by gravitation to the space 48 adjacent the auger.

The open bottom of the trough defined by the lower edge of wall portion 46 and rod 24 permits gravitation of trash, leaves or the like from the conveyor.

This conveyor is well suited for the transfer of relatively delicate items such as ripe fruit or the like from a relatively high elevation to a somewhat lower receiving station. When handling items of this type, it is often desirable to provide relatively soft padding such as soft or sponge rubber to the auger flighting. Such padding is designated by the reference numeral 52 in FIG. 2. Further, the tubes 26 and 38 may be surrounded by layers 54 of similar padding material and the wall portions 44 and 46 are preferably padded with a layer 56 of such material.

In the installation illustrated in FIG. 1, a pair of spaced apart plates 57 and 58 are also provided to support the entire assembly. As shown in FIG. 1, shafts 12 and 37 and supporting rods 18, 20, 22 and 24 all extend through these spaced apart plates. Shafts 12 and 37 cannot be permanently secured to the supporting plates at both ends since provision must be made for removal of the shafts from the plates for replacement of the auger tube 26 as may be necessary from time to time. This effectively precludes rigid attachment of the shafts to plate 58. Plate 14 is primarily a bearing thrust plate so the additional plate 57 is needed to support the weight of the curved shafts and the auger and to hold these components in their proper positions.

In other words, the movement from the weight of the outwardly curved components would tend to rotate these components about the pivot points at the junction of the components with the end plates 16 and 58 if it were not for the additional plate 57 spaced from plate 58 along the shafts and rigidly mounted along with plate 58 to support structure (not shown). Thus, plate 57 is in position to resist any force tending to rotate the shafts from their proper positions. It is apparent that plate 57 could be provided for this purpose at any desired point intermediate the plates 14 and 58 if it could also be secured to appropriate supporting structure.

It will be understood that the flexible characteristics of the conveyor of this invention readily adapt the conveyor to any of a variety of installations. While the conveyor trough may be curved to accommodate the curve of the auger as shown in FIG. 1, the trough may comprise a pair of hinged together sections 60 and 62 as illustrated in FIG. 7. As shown, the upper and lower supporting rods for the trough sections are interconnected by two pair of spaced apart side plates 64 and 65 (only one pair of which are shown in FIG. 7). Each pair is hinged together at 67 by pins 69 to permit articulation of the sections about the hinge joint so that the end of the conveyor may be moved between the full and dotted line positions illustrated in this figure of the drawings. Sections of the supporting shafts for tubes 26 and 38 are removed in the vicinity of the joint to permit flexing of the flexible tubes. Manifestly, a section of the vane 28 is also omitted at the joint and the spaced apart proximal ends of the vane are sufficiently close to permit transfer of items continuously along the auger during operation of the conveyor.

Figure 4:
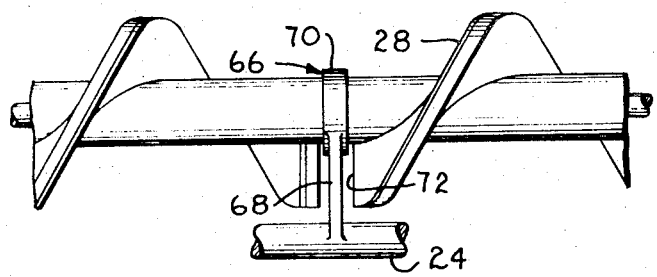
FIG. 4 is a fragmentary, side elevational view of an auger of this invention illustrating an intermediate auger support.

Provision is made for supporting the auger in spaced parallelism from the conveyor trough by supports broadly designated 66 and best illustrated in FIG. 4. Each support 66 comprises a rigid arm 68 having one end secured to a supporting member such as the elongated rod 24. The other end of arm 68 is secured to a ring 70 extending in circumscribing relationship around the flexible auger shaft 26. The latter is slidable within the ring to permit unhampered rotation of the auger while the same is supported by the supports 66. As illustrated in FIG. 4, the vane 28 has a gap 72 proximal each support 66 for clearing the arms 68 during rotation of the auger.

A direct drive for the flexible auger shaft 28 is illustrated in FIG. 11. In this case, the motor 74 is secured directly to the end plate 14 and the motor shaft 76 is coupled to tube 28 by the collar 34 and the coupling 30. This construction eliminates the need for the belt drive shown in FIG. 1 and auxiliary means may be provided for the rotatable deflector 38 in installations where such deflector is desired.

FIGS. 5 and 6 diagrammatically illustrate how the spaced apart, shaft supporting plates may be positioned in different locations to maintain the desired curvature for the flexible auger even though the central shaft or shafts are unsupported by structure such as supports 66. The FIG. 5 showing illustrates a plate 78 positioned in relatively close proximity to an end plate 80 to resist the tendency for the auger to rotate to the bottom of the trough. On the other hand, FIG. 6 illustrates how the supporting plate 78 may be positioned in proximal relationship to plate 82. This also will maintain the curvature even though the curvature is relatively remote from the anchoring plate 78. It is, of course, understood that the two closely spaced plates are fixed in some appropriate manner against movement under the forces imparted by the auger. The farther the plates are spaced apart, the easier it is to hold the shafts in proper positions.

FIGS. 8 and 9 illustrate diagrammatically how two curved auger sections 84 and 86 may be associated with one another through use of the joint of FIG. 10 and the support of FIG. 4 to provide a variable curvilinear path of travel for the conveyor. It should be noted that each shaft 12a and 12b respectively for each conveyor section has one pair of spaced apart supporting plates 88 and 90 respectively. The conveyor trough for the conveyor of FIGS. 8 and 9 is illustrated diagrammatically in FIG. 9 as hinged at 92 to show how the lower section 86 might be articulated or swung to any desired position during use of the conveyor.

FIG. 10 shows the shaft 12 jointed by means of a socket 94 which telescopically receives a projection 96 of the adjacent shaft section. This socket permits swinging of one curved shaft section 12a about the other curved shaft section 12b about the longitudinal axes of the socket and projection respectively. Where necessary, a key or similar retainer 98 may be incorporated at the joint for maintaining the sections together while permitting such relative rotation as is encountered while swinging one conveyor section with respect to the other.

Having thus described the invention, what is claimed as new and desired to be secured by Letters Patent is:

1. In combination,
   an auger for operating along a curvilinear axis, said auger comprising:
      an elongated, relatively rigid member extendtending along an axis,
      a flexible tube telescoped over said member and rotatable relative to the latter,
      a conveyor flight carried by the tube and comprising an elongated, helical vane constructed of flexible material and projecting outwardly from the outer surface of the tube in disposition for engaging articles to be conveyed, and
      means operably coupled with the tube for rotating the latter about said axis;
   an elongated housing extending along the auger and partially enclosing the latter, the auger being rotatable in the housing;
   an elongated, rotatable deflector extending along the auger in substantially spaced parallelism with the axis of the auger and spaced radially outwardly from the vane; and
   means operably coupled with the deflector for rotating the latter about its longitudinal axis.

2. The invention of claim 1, wherein said deflector comprises an elongated, transversely circular flexible element.

3. The invention of claim 2, wherein the element is a tubular hose.

4. The invention of claim 3, wherein is included a second shaft, and wherein said hose is telescoped over the second shaft for rotation about the axis of the latter, and means operably coupled with the hose for rotating the latter.

5. The invention of claim 4, wherein said means for rotating the hose includes structure for operably coupling the hose to the auger for simultaneous rotation of the hose and the auger and in the same direction.

6. The invention of claim 1, wherein said housing comprises a pair of spaced apart end plates, a plurality of elongated, mutually spaced apart bars having ends secured to each plate respectively, said bars defining a bottom and one side of the housing, and a second side for the housing comprising an upright wall extending between the end plates and spaced outwardly from the auger, the lower edge of the upright wall terminating at a higher elevation than the bottom of the tube, and an inclined wall extending downwardly at an angle from said lower edge of the upright wall to beneath the auger, the spacing between the upright wall and the tube being sufficient to receive articles to be conveyed between convolutions of the vane and the spacing between the inclined wall and the tube being dimensioned to prevent gravitation of the articles while permitting gravitation of trash therebetween.

7. A conveyor for operating along a curvilinear axis, said conveyor comprising:
   an elongated, relatively rigid member extending along said axis;
   a flexible tube telescoped over said member and rotatable relative to the latter;
   a conveyor flight carried by the tube and projecting outwardly from the outer surface of the tube in disposition for engaging articles to be conveyed;
   means operably coupled with the tube for rotating the latter about said axis; and
   an elongated element extending along the conveyor, and a support carried by the conveyor and supporting the tube, said support including a ring extending around the tube, the latter being slidable within the ring, and an arm secured to the element and the ring respectively for maintaining the ring in spaced relationship with the element.

8. The invention of claim 7, wherein said member comprises a pair of longitudinally aligned sections, there being a transversely circular elongated projection at the end of one of said sections, and wherein the proximal end of the other of said sections is provided with a socket in disposition complementally receiving the projection in telescoped relationship therein for rotation of the projection about its longitudinal axis within the socket, and means engaging the projection and said socket respectively for releasably securing the projection within the socket.

* * * * *